(12) United States Patent
Lang et al.

(10) Patent No.: US 8,162,786 B2
(45) Date of Patent: Apr. 24, 2012

(54) ASSEMBLY MEANS FOR A TENSIONING SYSTEM

(75) Inventors: Andreas Lang, Hausen (DE); Bernd Sebald, Eggolsheim (DE)

(73) Assignee: Schaeffler KG, Herzogenaurach (DE)

( * ) Notice: Subject to any disclaimer, the term of this patent is extended or adjusted under 35 U.S.C. 154(b) by 473 days.

(21) Appl. No.: 12/392,194

(22) Filed: Feb. 25, 2009

(65) Prior Publication Data

US 2009/0215562 A1 Aug. 27, 2009

(30) Foreign Application Priority Data

Feb. 26, 2008 (DE) .................. 10 2008 011 136

(51) Int. Cl.
*F16H 7/14* (2006.01)

(52) U.S. Cl. ........................................ 474/114; 474/117
(58) Field of Classification Search .................. 474/109, 474/110, 113, 116, 117, 133, 135, 114
See application file for complete search history.

(56) References Cited

U.S. PATENT DOCUMENTS

2008/0020877 A1* 1/2008 Bogner .................. 474/110
* cited by examiner

*Primary Examiner* — William E Dondero
(74) *Attorney, Agent, or Firm* — Lucas & Mercanti, LLP

(57) ABSTRACT

The invention relates to a traction mechanism drive (1) of an internal combustion engine, which comprises an output member (2) and also a drive member (3) in which the associated belt pulleys (5, 7) are connected via a traction mechanism (6). In this case, the pivotably arranged drive member (3) is supported via a spring means (9) which can pivot, in conjunction with a deflection lever (13), between an assembly position (17) and an operating position (18).

9 Claims, 3 Drawing Sheets

US 8,162,786 B2

ASSEMBLY MEANS FOR A TENSIONING SYSTEM

This application claims the priority of DE 10 2008 011 136.8 filed on Feb. 26, 2008 which is incorporated by reference herein.

FIELD OF THE INVENTION

The invention relates to a traction mechanism drive of an internal combustion engine, which comprises an output member and at least one drive member, the associated belt pulleys or running pulleys of which are connected via a traction mechanism, in particular a belt. A unit, which can pivot about a pivot point, at the same time performs the function of a tensioning device, is acted on by a spring means and is supported on the traction mechanism via a belt pulley or running pulley, is provided to attain sufficient pre-tensioning of the traction mechanism.

BACKGROUND OF THE INVENTION

Traction mechanism drives of this design are provided for internal combustion engines, in particular for driving units such as for example a water pump, air-conditioning compressor, generator or power steering pump. The traction mechanism used for a traction mechanism drive of this type, which may also be referred to as a unit drive, is preferably a traction mechanism which is configured as an endless belt. Sufficient pre-tensioning of the traction mechanism is required to ensure substantially slippage-free driving of all the units and to attain a long service life of the traction mechanism. For this purpose, known traction mechanism drives use tensioning devices or tensioning systems in which a running roller or a tensioning roller is guided on the traction mechanism under the application of force.

DE 68 04 829 U discloses a unit drive for an internal combustion engine, in which a pivotably arranged generator is supported on the traction mechanism via the belt pulley to attain sufficient pre-tensioning of the traction mechanism. The pre-tensioning force of the traction mechanism is influenced via a spiral spring which is associated with a threaded sleeve having a left-hand thread and a right-hand thread. After assembly of the traction mechanism, the threaded sleeve is first rotated until sufficient pre-tensioning of the traction mechanism is set before the pre-tensioned spiral spring is associated with the sleeve. In the operating state, the pre-tensioned spiral spring causes, on lengthening of the traction mechanism, automatic rotation of the sleeve, in conjunction with pivoting of the generator allowing increased pre-tensioning of the traction mechanism to be attained.

According to DE 196 09 420 A1, the tensioning device includes a mechanical/hydraulic actuating element. This device comprises a housing, at the center of which a cylinder is arranged for receiving a longitudinally displaceable piston. In the axial extension of the piston, a fastening eye, which is used pivotably to fasten the hydraulic element to the tensioning roller carrier, is provided at the end side. A further fastening eye, which is used pivotably to fasten the tensioning device to the internal combustion engine, is arranged on the housing. A spring force is applied to the piston which is inserted in the cylinder in a longitudinally displaceable manner and delimits a pressure chamber in the cylinder. A piston movement causes a volume exchange of the hydraulic fluid between the pressure chamber and the supply chamber of the housing.

SUMMARY OF THE INVENTION

The present invention is based on the object of providing, for a traction mechanism drive comprising at least two pulleys, a device allowing simplified assembly of the traction mechanism.

According to the present invention, the problem posed is solved by a traction mechanism drive of an internal combustion engine an output member having a first belt pulley, at least one drive member having a second belt pulley and being pivotable about a pivot point, a traction mechanism connecting the first belt pulley and the second belt pulley, spring means acting on the drive member, which serves as a tensioning device for pre-tensioning the traction mechanism, a hinge pin, a deflection lever pivotable about the hinge pin between a first end position and a second end position, the first end position being an assembly position and the second end position being an operating position, and spring means acting on the drive member via the deflection lever, wherein the hinge pin is fixed to the drive member at a position different from the pivot point so that the traction mechanism is pretensioned in the operating position and relaxed in the assembly position. This construction is suitable preferably for traction mechanism drives in which the start/stop generator or starter generator at the same time assumes the function of the tensioning system in that the generator ensures, pre-tensioned via a spring means, sufficient pre-tensioning of the traction mechanism. The deflection lever, which is in accordance with the invention associated directly with the pivotable unit or the generator, allows belt assembly which is simplified in accordance with the invention also for a traction mechanism drive which comprises two belt pulleys positioned closer together and accordingly includes a relatively short traction mechanism or belt. According to the invention, following the assembly of the pivotable unit in conjunction with the spring means which is arranged on the unit via a deflection lever, the pivotable unit can first be pivoted into an assembly position ensuring an optimally short distance between the belt pulleys. This allows straightforward, simplified placement of the traction mechanism onto the associated belt pulleys before the deflection lever is subsequently pivoted into the operating position, thus automatically setting sufficient pre-tensioning of the traction mechanism via the spring means. Furthermore, the invention allows simple disassembly of the traction mechanism or belt in that the deflection lever is pivoted from the operating position into the assembly position, in conjunction with relaxation of the traction mechanism, allowing said traction mechanism to be easily exchanged. The assembly process is accordingly reversible and can be repeated as often as desired, producing simplified exchange of the traction mechanism also in the event of service. In order to attain an inexpensive solution which increases the size of the component circumference only slightly, the invention can be carried out using an additional part, the deflection lever which is inserted between the unit and the spring means.

In order to provide a defined position, the deflection lever is supported in the operating position on a contact surface directly on the unit or indirectly via an additional separate element. A component-optimized solution includes a deflection lever which can pivot about a hinge pin, which is associated with the unit in a stationary manner, and is supported in the operating position directly on a contact surface of the unit. Alternatively thereto, a construction is suitable in which the deflection lever interacts with a stop element which is fastened separately to the unit. The stop element, which includes both the hinge pin and the contact surface, is in this case preferably detachably fastened to the unit. A suitable stop element is advantageously a rail having an L-shaped or Z-shaped profile in which one leg forms the contact surface on which the deflection lever is supported in the operating state.

The further configuration of the stop element includes a cylindrical pin which is positioned at the end side and forms the hinge pin for the deflection lever. At the end opposing the hinge pin, the deflection lever also forms an articulation point for the spring means. In order to simplify the setting or adjustment of the deflection lever, it is expedient to provide the lever with a tool receptacle, which is for example embodied as a recess having an internal hexagon profile which is intended to receive an internal hexagon key which can be used to adjust the deflection lever in a simplified manner between the assembly position and the operating position.

In order to provide durable securing of the deflection lever in the operating position, there is provided between the articulation point of the spring means and the hinge pin of the deflection lever a fixing screw which, guided through a hole in the deflection lever, is screwed into a corresponding hole in the pivotable unit. A preferred configuration of the deflection lever makes provision for a distance "$S_1$" between the hinge pin of the deflection lever and an articulation point intended for the spring means to be $\geq 1.5$ to $\leq 2.5$ times the distance "$S_2$" between the fixing screw and the hinge pin.

At the end remote from the pivotable unit, the spring means is preferably positioned in an articulated manner on a housing of the internal combustion engine. Alternatively thereto, the invention includes a separate holding element which is for example embodied and arranged so as to produce an optimum introduction of force, starting from the spring means, into the pivotable unit in the operating position.

A generator or a starter generator which can be used for a start/stop system is suitable as a preferred pivotable unit which at the same time assumes the function of the tensioning system. Alternatively thereto, the invention is also transferable to a traction mechanism drive including as the pivotable unit a water pump, air-conditioning compressor or power steering pump or any other suitable unit.

Furthermore, the invention is transferable to differingly embodied spring means. Preferably, a mechanical spring/damper unit is provided as the spring means. Alternatively thereto, a hydraulic spring means or an electrically acting actuator is suitable.

Fastening screws or fastening means which can be released in a correspondingly alternative manner are suited as suitable fastening means for the deflection lever and also the stop element.

BRIEF DESCRIPTION OF THE DRAWINGS

Preferred exemplary embodiments illustrate the invention, although the invention is not restricted to the exemplary embodiments described hereinafter. In the drawings.

DETAILED DESCRIPTION OF THE DRAWINGS

Figure 1:
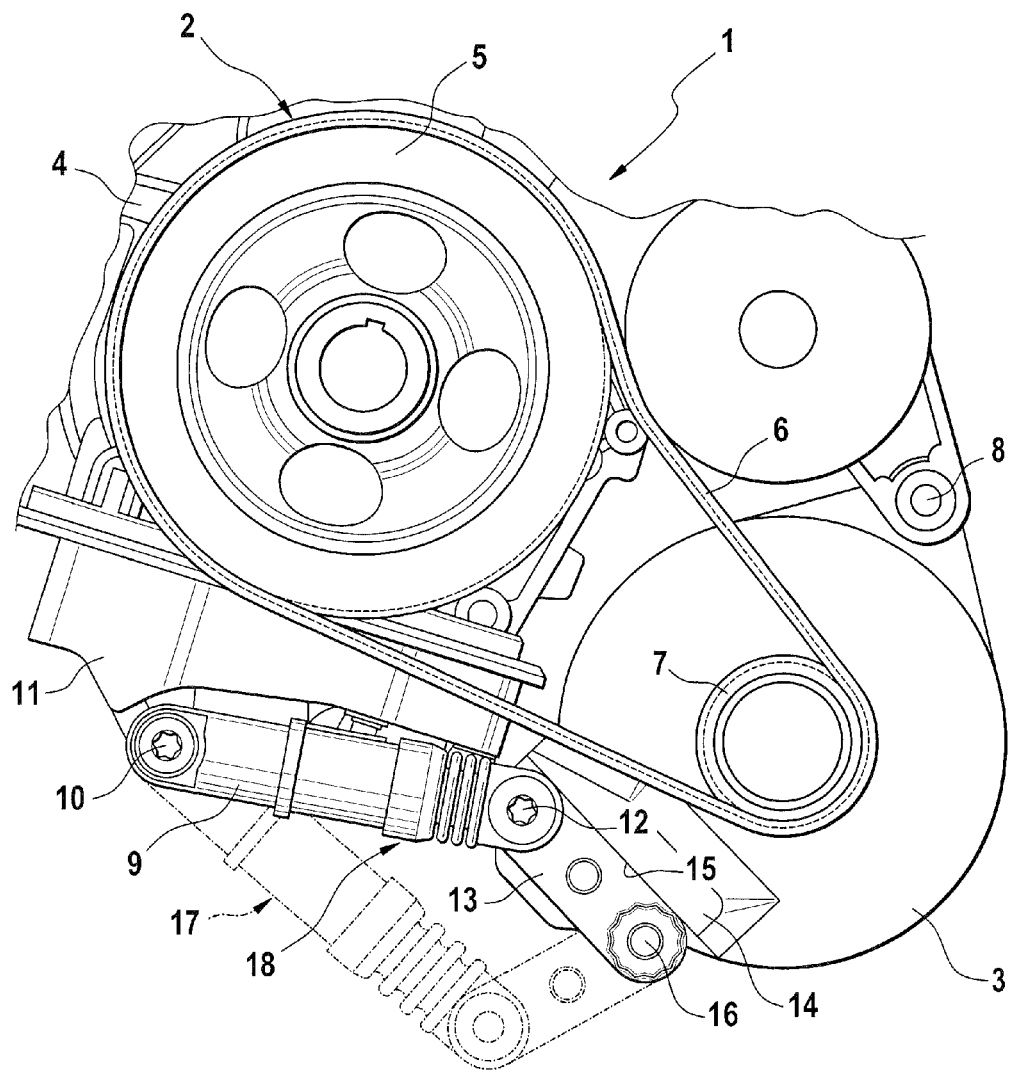
FIG. 1 is a view of the construction of a traction mechanism drive constructed in accordance with the invention.

FIG. 1 shows a traction mechanism drive 1 which is constructed in accordance with the invention as a two-pulley drive between a output member 2 which is associated with a crankshaft of an internal combustion engine 4 and a drive member 3 which is embodied as a pivotable unit. A belt pulley 5 of the output member 2 is in this case connected to a belt pulley 7 of the drive member 3 via a traction mechanism 6, in particular a belt. To simplify assembly of a traction mechanism, the drive member 3, in particular a starter generator, can pivot between the visibly shown operating position and an assembly position indicated by broken lines. A spring means 9, which is fastened in an articulated manner via a first articulation point 10 to a holding element which is associated in a fixed manner with the internal combustion engine 4, is provided to attain sufficient pre-tensioning of the traction mechanism 3 in the operating position. The spring means 9 is associated with a deflection lever 13, which can rotate about a hinge pin 16 of the stop element 14, via a further articulation point 12. The stop element 14 forms a separate component associated with the drive member 3 and incloses a contact surface 15 against which the deflection lever 13 rests in a force-fitting manner in the operating position 18 shown. In this case, the spring means 9 applies at the same time a force acting in the anticlockwise direction on the drive member 3, to attain sufficient pre-tensioning of the traction mechanism 6. In order to assemble the traction mechanism, the deflection lever 13 is rotated into the assembly position 17, wherein in synchronization therewith the drive member 3 exerts a movement directed in the clockwise direction into the assembly position 17 in which a simplified exchange or assembly of the traction mechanism 6 is possible.

Figure 2:
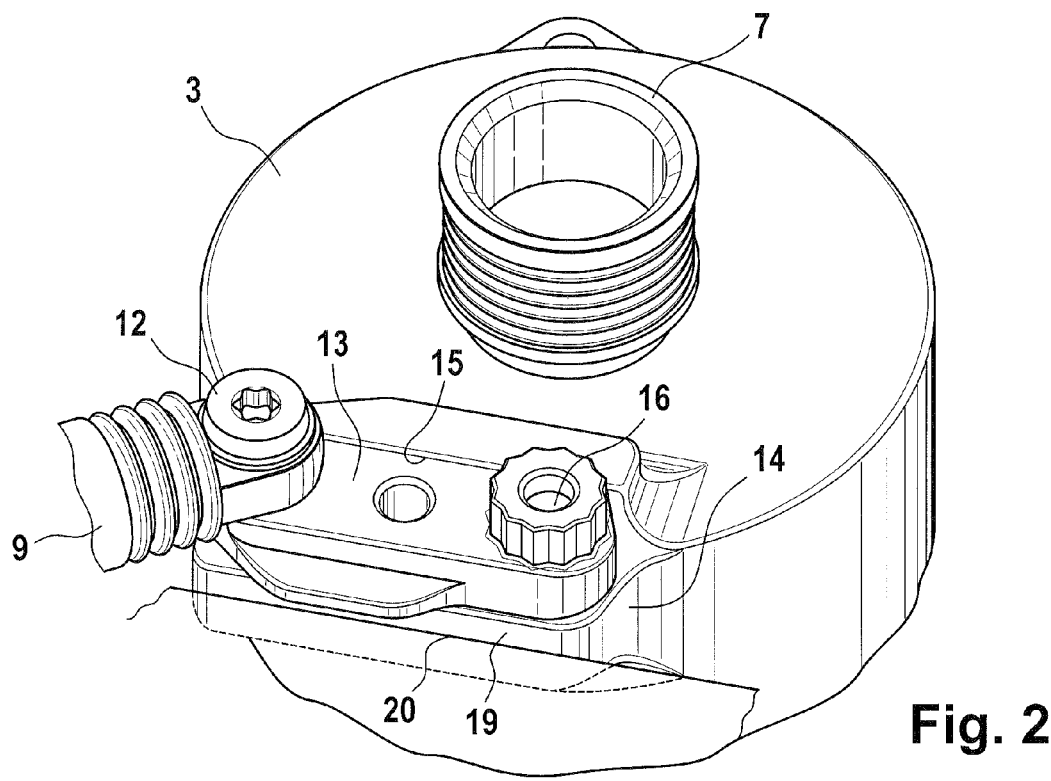
FIG. 2 shows the arrangement of the spring means in conjunction with the deflection lever and stop element in the integrated state.
Figure 3:
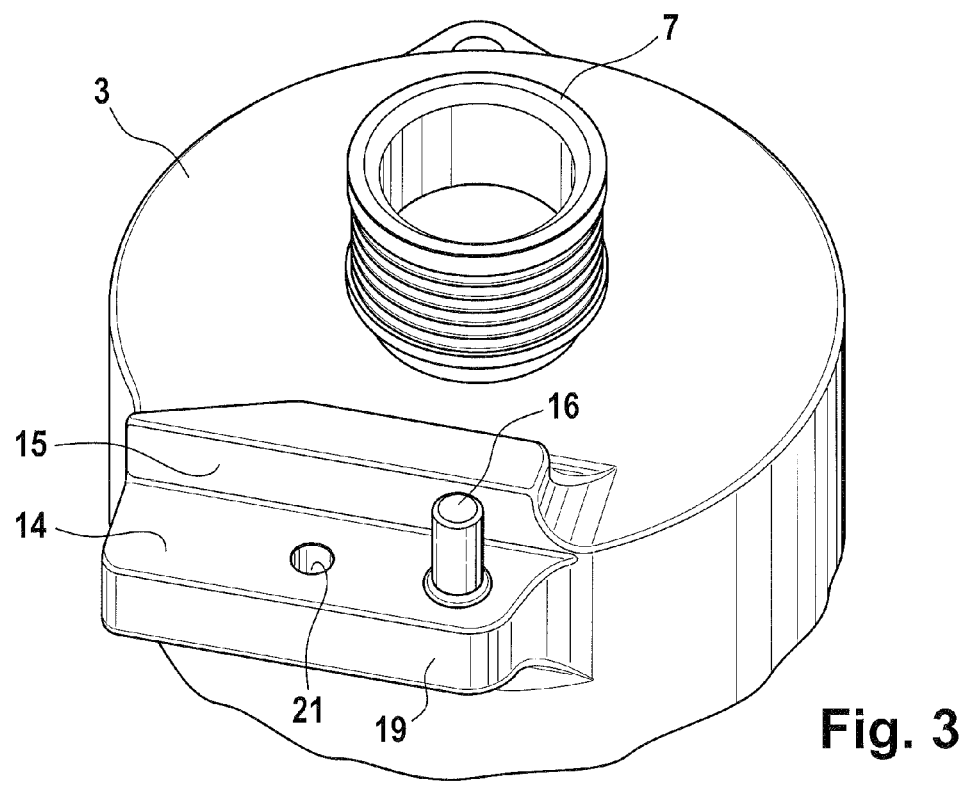
FIG. 3 shows the stop element arranged on the pivotable unit.
Figure 4:
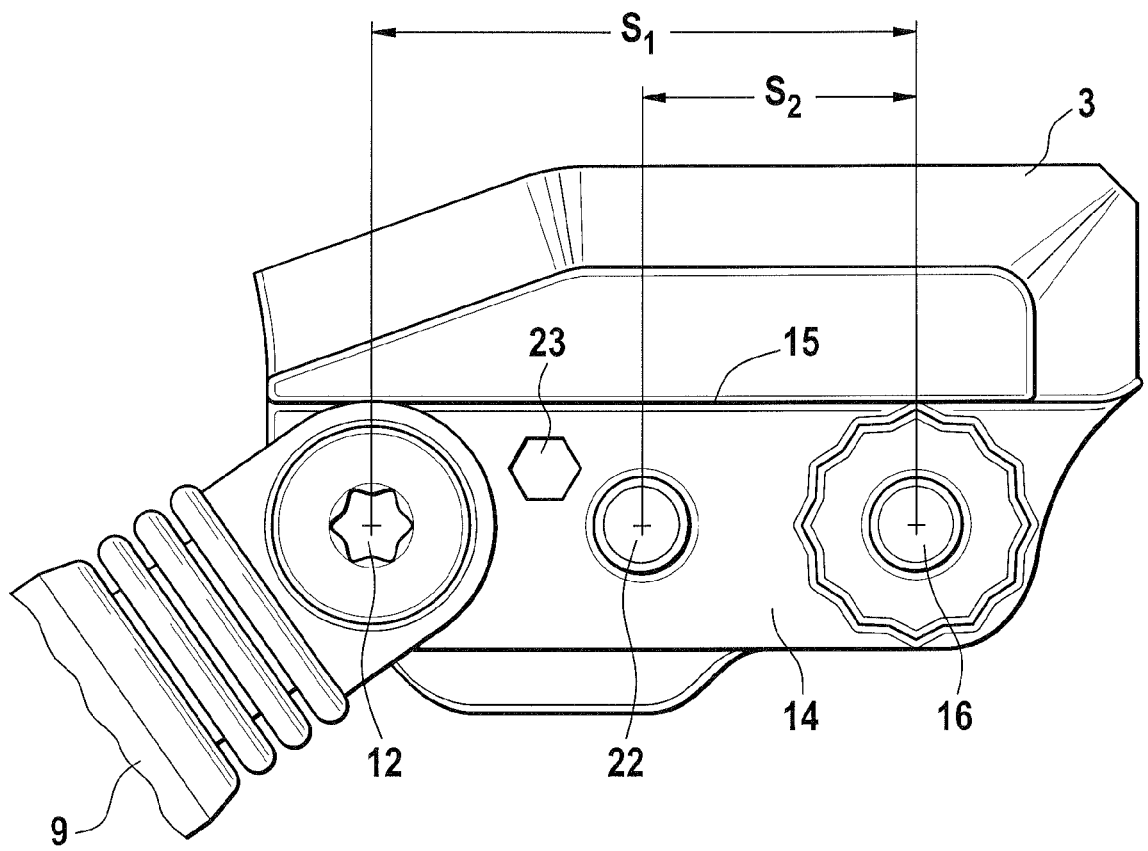
FIG. 4 is an enlarged view of the deflection lever in the operating state.

FIGS. 2-4 show in an enlarged view details of the articulation according to the invention of the spring means 9.

According to FIG. 2, the stop element 14 has a Z-shaped profile, of which a leg 19, pointing in the direction of the drive member 3, engages with a receptacle 20 in a form-fitting manner. In this case, the stop element 14 is releasably fixed to the drive member 3 via a fastening which is not illustrated in FIG. 2, in particular a screw connection. For securing the deflection lever 13, it is expedient to embody the hinge pin 16 as a screw.

As shown in FIG. 3, the stop element 14 also includes a hole 21 which is arranged so as to be offset axially from the hinge pin 16 and corresponds, in the installation position of the stop element 14, with a hole in the drive member 3. The hole 21 serves to receive a fixing screw 22 which is illustrated in FIG. 4 and is used to position the stop element 14 in the operating position 18, and at the same time durable securing of the deflection lever 13 and also of the stop lever 14 is set.

According to FIG. 4, the stop element 14 is furthermore provided with a tool receptacle 23, embodied as an internal hexagon, into which a separate tool (not shown) can be inserted in a form-fitting manner to adjust the stop element 14 between the operating position 17 and the assembly position 18. The design of the stop element provides for a distance "$S_1$" between the hinge pin (16) of the deflection lever (13) and an articulation point (12) intended for the spring means (9) to be $\geq 1.5$ to $\leq 2.5$ times the distance "$S_2$" between a fixing screw (22) and the hinge pin (16).

LIST OF REFERENCE NUMERALS

1 Traction mechanism drive
2 Output member
3 Drive member
4 Internal combustion engine
5 Belt pulley
6 Traction mechanism
7 Belt pulley 8 Pivot point
9 Spring means
10 Articulation point
11 Holding element
12 Articulation point
13 Deflection lever
14 Stop element
15 Contact surface
16 Hinge pin
17 Assembly position
18 Operating position
19 Leg
20 Receptacle
21 Hole
22 Fixing screw
23 Tool receptacle

The invention claimed is:

1. A traction mechanism drive of an internal combustion engine comprising:
    an output member having a first belt pulley;
    at least one drive member having a second belt pulley and being pivotable about a pivot point;
    a traction mechanism connecting the first belt pulley and the second belt pulley;
    spring means acting on the drive member, which serves as a tensioning device for pre-tensioning the traction mechanism;
    a hinge pin;
    a deflection lever pivotable about the hinge pin between a first end position and a second end position, the first end position being an assembly position and the second end position being an operating position; and
    said spring means acting on the drive member via the deflection lever, wherein the hinge pin is fixed to the drive member at a position different from the pivot point so that the traction mechanism is pretensioned in the operating position and relaxed in the assembly position.

2. The traction mechanism drive according to claim 1, wherein the deflection lever is supported in the operating position on a defined contact surface associated with the drive member.

3. The traction mechanism drive according to claim 2, wherein the deflection lever is supported in the operating position on the contact surface of the drive member.

4. The traction mechanism drive according to claim 2, wherein the deflection lever interacts with a stop element which is fastened separately to the drive member and includes both the hinge pin and the contact surface.

5. The traction mechanism drive according to claim 4, wherein the stop element includes, for the purposes of adjustment, a tool receptacle which allows simplified pivoting between the assembly position and the operating position.

6. The traction mechanism drive according to claim 4, wherein the deflection lever is positioned in the operating position by means of a fixing screw.

7. The traction mechanism drive according to claim 4, further comprising screws as fastening means for the stop element and also for the deflection lever.

8. The traction mechanism drive according to claim 2, wherein a distance "$S_1$" between the hinge pin of the deflection lever and an articulation point intended for the spring means is $\geq 1.5$ to $\leq 2.5$ times a distance "$S_2$" between a fixing screw and the hinge pin.

9. The traction mechanism drive according to claim 2, further comprising a separate holding element fastened to the internal combustion engine which is associated with the spring means.

* * * * *